United States Patent [19]

Smitt

[11] Patent Number: 5,502,578
[45] Date of Patent: Mar. 26, 1996

[54] OPTICAL SCANNER HAVING A VARIABLE RESOLUTION

[75] Inventor: Asbjørn Smitt, Aalsgarde, Denmark

[73] Assignee: Contex A/S, Denmark

[21] Appl. No.: 213,990

[22] Filed: Mar. 16, 1994

[51] Int. Cl.⁶ .............. H04N 1/40; H04N 1/04; H04N 3/14; H01L 27/00
[52] U.S. Cl. .......... 358/474; 358/443; 358/455; 358/483; 250/208.1; 348/312
[58] Field of Search .............. 358/261.1, 261.4, 358/434, 438, 443, 445, 455, 456, 459, 460, 468, 474, 483; 250/208.1; 382/298; 348/312

[56] References Cited

U.S. PATENT DOCUMENTS

| | | | |
|---|---|---|---|
| 4,934,821 | 6/1990 | Morton | 348/107 |
| 5,303,064 | 4/1994 | Johnson et al. | 358/483 |
| 5,402,234 | 3/1995 | Deck | 356/357 |
| 5,452,109 | 9/1995 | Compton | 358/483 |

*Primary Examiner*—Edward L. Coles, Sr.
*Assistant Examiner*—Kimberly A. Williams
*Attorney, Agent, or Firm*—Willian Brinks Hofer Gilson & Lione

[57] ABSTRACT

An optical scanner having a variable resolution wherein an optical detecting unit controlled by a pixel clock signal generates a discrete signal representing pixels scanned in a region. An analog-to-digital converter converts the signal to a digital signal with a preselected resolution controlled by a sample clock generator. The sample clock generator receives the pixel clock signal, and through a counter and a store, operates an addressed, binary data word which is sent to a register. The register is coupled to a further periodic clock generator that controls reading from the register and provides a clock signal with pulses when the bits of the data word assume a first binary state, and no pulses when the bits assume a second binary state. The clock signal is passed to the analog-to-digital converter as a sample clock signal.

47 Claims, 5 Drawing Sheets

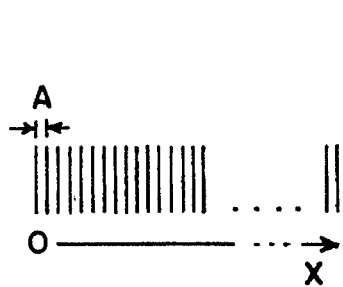
FIG. 4
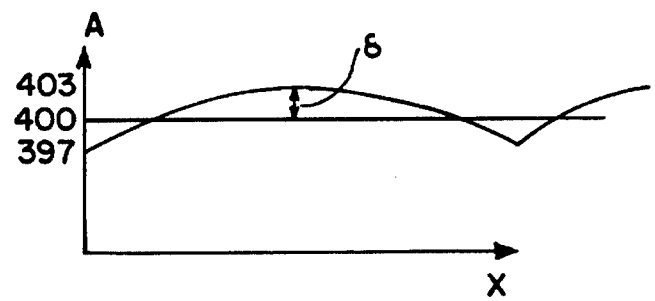
FIG. 5
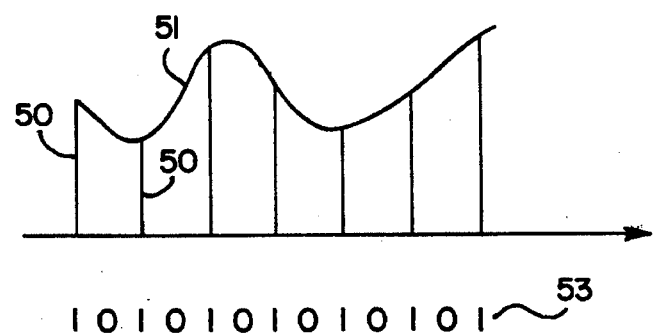
FIG. 6
FIG. 7

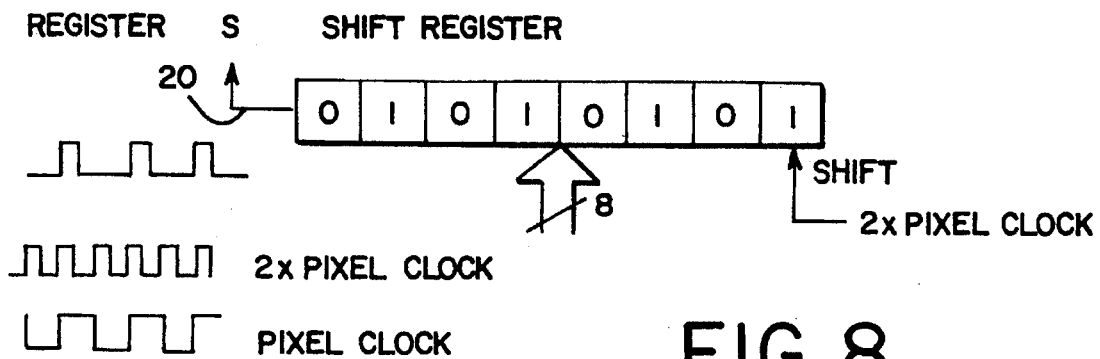
FIG. 8
FIG. 9
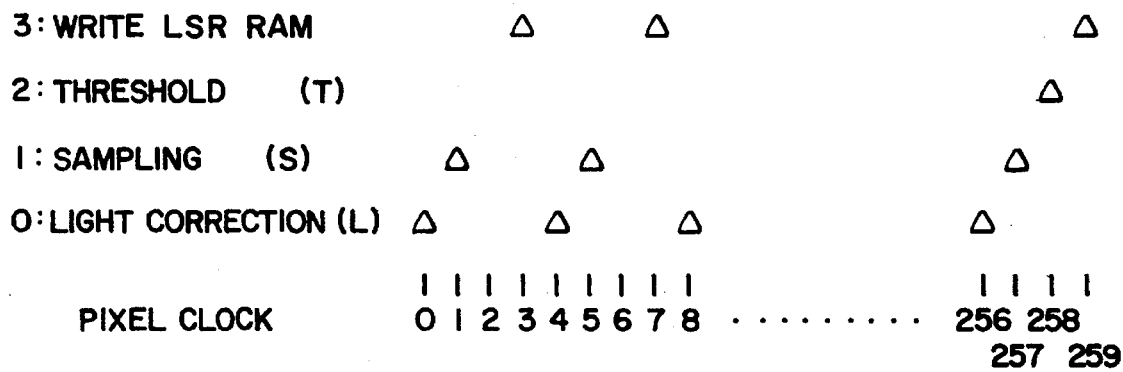
FIG. 10
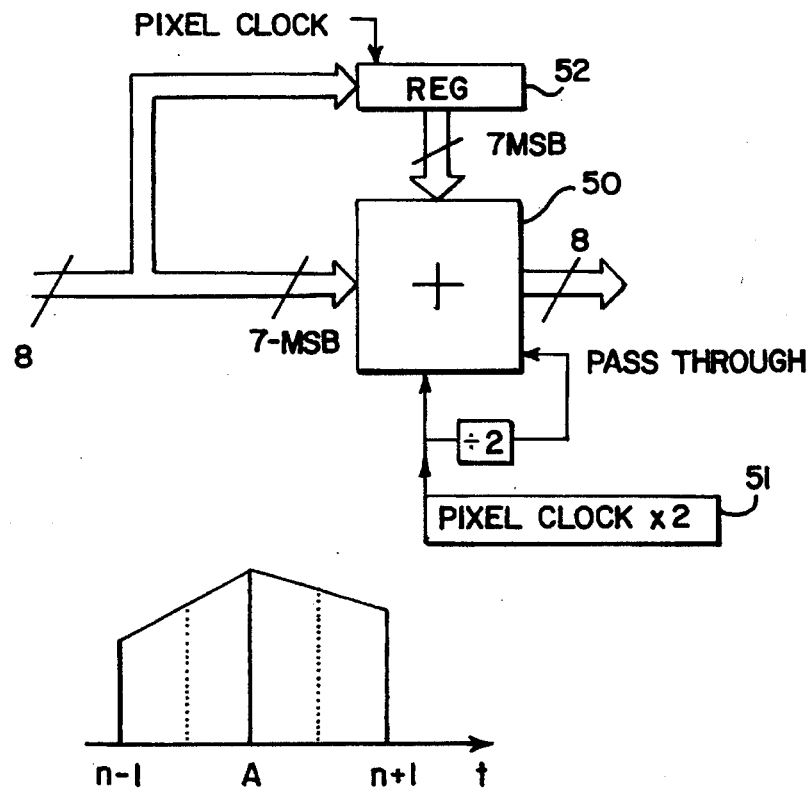

OPTICAL SCANNER HAVING A VARIABLE RESOLUTION

BACKGROUND OF THE INVENTION

1. Field of the Invention

The invention generally concerns optical scanning systems, including systems having a high resolving power for scanning documents and the like to generate digital, binary data which represent the scanned information. The scanned information can then be stored electronically for later computer processing. There is a great need for a facility for the scanning of documents, drawings and similar materials, thereby saving storage space and facilitating corrections of drawings, etc.

2. Background of the Invention

Since scanning systems of this type are designed to scan very broad documents, the optical system in front of the actual scanning unit or the CCD camera will be utilized to the utmost. Thus, use is made of very expensive lens beams which are either mounted mechanically very stably or are stitched together, as shown in U.S. Pat. No. 5,117,295. The optical system is arranged stationarily in front of the CCD cameras, and the scanning unit is therefore borne with a constant resolution which depends upon the configuration of the documents, the lens system and the CCD cameras as well as the density of the photosensitive cells on the CCD camera.

If a variable resolution of the document of the scanned data is desired, such is provided by the subsequent data processing of the written data internally in the optical scanner. U.S. Pat. No. 4,631,598, U.S. Pat. No. 4,972,273 and U.S. Pat. No. 5,218,457 provide examples of such subsequent data processing. The analog signals from the CCD cameras are converted into digital signals, which takes place controlled by a periodic clock signal. If the resolution is to be enhanced, new grey level values are then estimated between already existing grey level values which are determined by sampling. According to the method disclosed in these documents it is not possible to select an arbitrary position of these estimated grey level values, because of the limitations imposed by the algorithms on which the method is based. Thus, it is not possible to choose an arbitrary resolution of the written data, which is generally desirable in many cases.

The object of the invention is therefore to provide an optical scanning system in which the resolution can be selected freely.

Another object of the invention is to provide an optical scanning system wherein the variable resolution enables compensation for imaging errors in the optical system of the scanner.

SUMMARY OF THE INVENTION

The present invention overcomes the drawbacks and limitations of the prior art in connection with the selection of resolution. The invention provides an optical scanner having a variable resolution and comprising a detecting unit which, controlled by a pixel clock signal, applies a discrete signal representing pixels scanned in a region, a filter for filtration of the discrete signal, clock-controlled analog-to-digital converter means which convert the signal received on their input to a digital representation having a preselected resolution, said resolution being controlled by a sample clock generator, said sample clock generator comprising a counter means, a store as well as a first register, said counter means receiving the pixel clock signal on the input and applying a multibit signal on the output, said store containing binary data words, said multibit signal from the counter means serving as an address signal, an addressed, binary data word being read from the store, said first register receiving the read, binary data word from the store and being coupled to a further periodic clock generator which controls reading from the register so as to provide a clock signal having clock pulses when the individual bits of the data word assume a first binary state, and having no clock pulses when the bits of the data word assume a second binary state, said clock signal being applied to the analog-to-digital converter means as a sample clock signal.

It may be said here that the objects of the invention are achieved in that the written information is clocked out of the CCD camera by the inherent pixel clock signal of the system, and that the data signal thus clocked is sampled or resampled subsequently with a new clock signal which possesses precisely the desired clock frequency, thereby achieving the desired resolution. The essential feature of the invention is precisely this clock signal which is provided in a special manner in terms of clock signals, because the signal is stored as sequences in a RAM store, which are read successively and are transferred to a register. This register is read bit by bit under the control of a further clock generator having a clock frequency which is higher than the desired clock frequency. The clock signal generated by the register is thus synchronous with the clock signal from the further clock frequency generator, but some of the clock pulses will be missing.

In the preferred embodiment a bit in the register corresponding to a binary 1 involves the presence of a clock pulse, while a binary 0 involves non-presence of a clock pulse. The clock signal from the register is thus not periodic. Prior to scanning, a controller calculates how the clock pulses in the clock signal from the register are to be distributed in response to the desired resolution, and the sequences necessary for achieving this clock signal are stored as data words in the RAM store. A counter successively addresses these data words, which are read and transferred to the register, where the further clock frequency generator clocks the contents of the clock register to provide the desired clock signal. The further frequency generator typically supplies an integer multiple of the pixel clock frequency when a fine resolution is desired, and equal to the clock frequency or less when a coarse resolution is desired.

Since the clock signal of the register is synchronous with the pixel clock signal, but is not periodic, it is possible to determine the clock signal of the register in a manner such that the clock pulses are as close to being periodic as possible, while compensating for imaging errors in the optical system of the scanner.

These and other objects and advantages are achieved in the embodiments illustrated herein.

BRIEF DESCRIPTION OF THE DRAWINGS

FIG. 4 illustrates the pattern of a reference sheet for determining optical errors in a lens system for an optical scanner;

FIG. 5 illustrates the importance of the optical errors for the resolution of the scanner;

FIG. 6 shows the analog signal picked-up by the CCD camera of the scanner;

FIG. 7 illustrates how the resolution changes;

FIG. 8 illustrates how the clock signal is generated by the shift register in the unit according to the invention;

FIG. 9 illustrates how the store cells of the RAM store are addressed by the counter in the unit according to the invention;

FIG. 10 shows a digital filter for use in connection with the unit shown in FIG. 3.

DETAILED DESCRIPTION OF THE INVENTION

Figure 1:
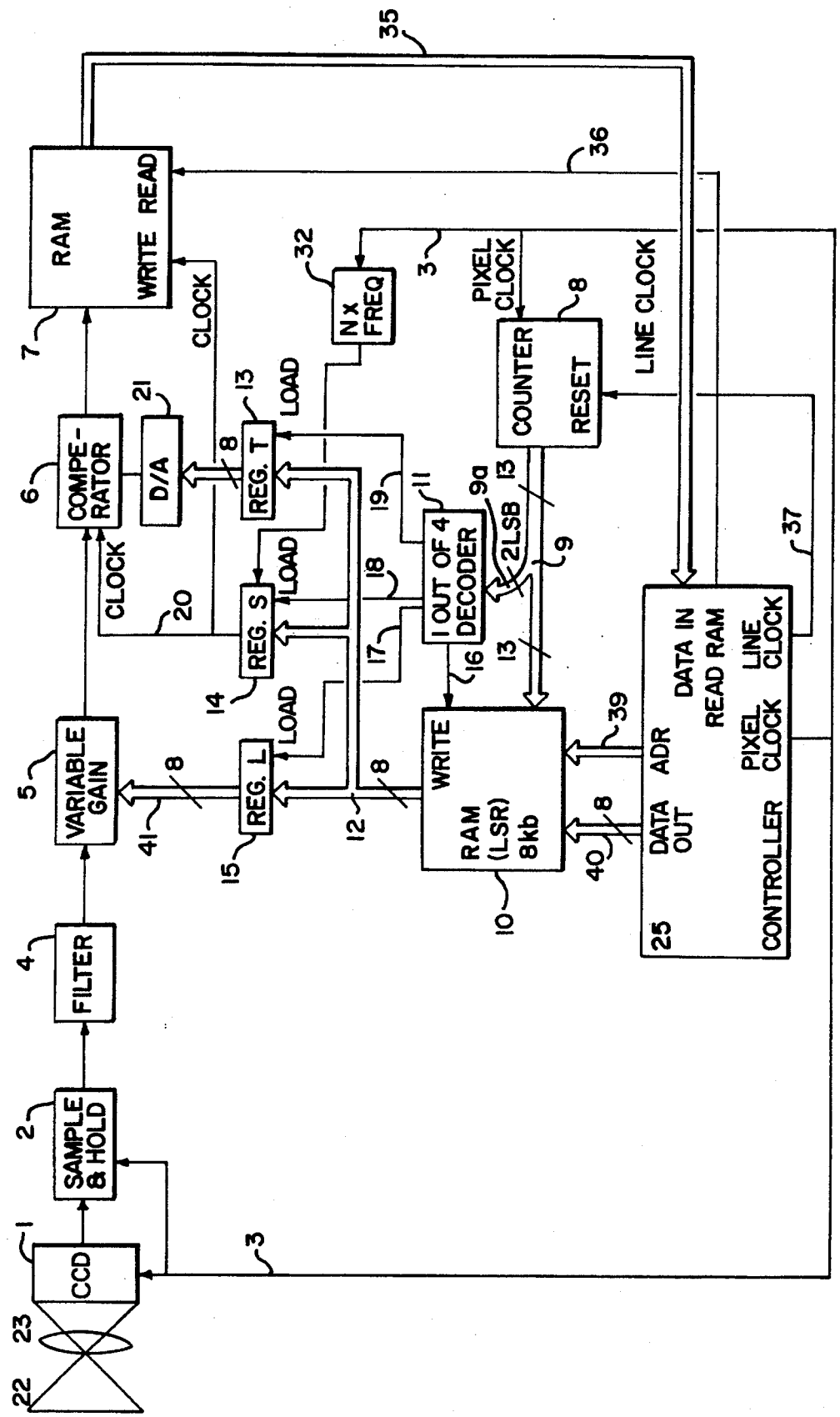
FIG. 1 shows a preferred embodiment and a unit according to the invention for varying the resolution of an optical scanner.

The invention concerns an optical scanner having a unit for varying the resolution of the scanner, and this is shown in FIG. 1. The optical scanner may have a variable resolution, or it may have variable resolving power. An original or a document 22 is imaged via a lens system 23, e.g., in the form of a lens beam on a scanning or optical detecting unit, which is a CCD camera 1 in FIG. 1. The document 22 is caused to pass the CCD camera 1, while lines transversely to this are scanned with the CCD camera 1. The information on the document 22 is read with a resolution of e.g., 400 dpi by means of the CCD camera 1, and the contents of the light-sensitive cells of the CCD camera are clocked by means of a pixel clock signal 3, which controls both the CCD camera 1 and a sample and hold circuit 2.

Thus, an analog signal maintaining the signal level over an entire clock period for the pixel clock signal 3 is applied to the output of the sample and hold circuit 2. The discrete signal may thus be considered as being an analog stage signal. This signal is passed to a filter 4, which is preferably a lowpass filter, whereby the discrete, analog signal is smoothed. From the filter 4, the analog signal is passed to a variable gain amplifier 5 which corrects non-linearities or variations in the individual, light-sensitive cells of the CCD camera 1. This will be explained in detail later.

Then the filtered, corrected analog signal is passed to a comparator 6 where it is compared with an analog threshold value, whereby the comparator 6 applies a signal to the output, and this signal may assume two binary values in response to whether the analog signal on the input is above or below the threshold value. The comparison takes place controlled by a clock signal on the line 20, and this clock signal also controls the storage of the binary signal in a RAM store 7. The clock signal on the line 20 thus resamples the scanner signal picked-up by the CCD cameras 1, and this resampling takes place using a new clock signal independent of the pixel clock signal 3.

Data from the RAM store 7 are transferred via a data bus 35 to a controller 25, and the controller itself controls the read-out by applying read signals via a connection 36.

The controller 25 comprises or is associated with a pixel or sample clock generator, which controls the clocking of data from the CCD camera or array 1 via a connection 3. In addition, the pixel clock signal is passed to a counter 8 which is an incremental counter, i.e., the counter counts one up each time a clock pulse in the pixel clock signal is received, and the counter applies a multibit digital signal to the output.

The controller 25 additionally has a line clock generator. The line clock generator controls the feed of the document 22, and this is well-known and therefore not shown in the drawing. In addition, the line clock signal is applied via a connection 37 to the counter 8, where a line clock pulse resets the contents of the counter.

The controller 25 controls the processing of the analog signal picked-up by the CCD camera 1, and this analog signal is corrected i.e. for variations in the light sensitivity of the light sensitive cells of the CCD camera 1. Prior to the scanning of the document, a reference scanning of a white reference is performed. The ratio of the presence of the individual pixels in the analog signal to the white reference is determined, and this ratio is used as a multiplication factor in the variable gain amplifier 5. This correction principle is known per se and is described e.g., in U.S. patent application Ser. No. 07/890,576, which is incorporated by reference in the present application. Thus, the controller calculates correction factors for each individual pixel or for groups of pixels along an entire scanning line. These corrections factors are transferred to the RAM store 10 via a data bus 40 and an address bus 39.

The correction factors are stored as data words in the RAM store 10, and these data words are addressed by the counter 8 via a 13-bit data bus 9. The data bus 9 has a branch leading the two least significant bits (LSB) to a decoder 11, which thus alternately selects one or more registers as a receiver of the data words read from the RAM 10. Since only three registers are used in the present embodiment, there will be no read-out from the RAM store 10 for some of the time. During that time, new data may instead be written into the RAM store. Data concerning the light correction factors are transferred via the data bus 8 to a register 15, into which data are loaded by means of the decoder 11 applying a load signal via the connection 17.

The data word is transferred from the register 15 to the variable gain amplifier 5, and in the present embodiment the data word is transferred via an 8-bit bus connection 41. Since a new correction factor is transferred only for every four pixels, four successive bits will be corrected by one and the same correction factor. This is ordinarily satisfactory, since the light sensitivity of the cells in the CCD camera 1 is reasonably constant locally, but may vary somewhat when the entire array is considered.

The optical system 23 imaging the document 22 on the CCD camera 1 will be vitiated by spherical errors. If a reference having equidistant bars is scanned, where the scanning line is located transversely to these bars, a variation may be observed at a distance between the bars for the signal generated by the scanner, which is caused by lens errors. If e.g., the distance between the bars A is ¼mm, there will be about 100 bars per inch. If the scanning unit scans with 400 dpi, e.g., an error w can be observed, while a resolution in the center of the array of 403 dpi may be observed, and a resolution of 397 dpi may be observed at the ends of the array. If several arrays are coupled together, this will give rise to the curve shape shown in FIG. 5.

The variable resolution of the scanner of the invention is obtained in that the user of the scanner enters (user interface not shown) a desired resolution of the scanned document. If e.g., he enters a resolution of 600 dpi, the controller 25 calculates the position of the desired sampling point along the scanning line. Then the clock frequency in a second clock generator 32 is fixed so as to be greater than the desired clock frequency of the comparator 6. The clock generator 32 is preferably a frequency multiplier which receives an arriving periodic signal, e.g., the pixel clock for a divided module thereof, on the input and applies a corresponding periodic signal on the output, but with a greater frequency, typically multiplied by an integer N. With a desired resolution of 600 dpi it is expedient in the preferred embodiment that the frequency multiplier is a frequency doubler which multiplies the frequency of the pixel clock signal by two.

The signal from the CCD camera 1 gives a resolution of 400 dpi. Using the clock signal from the further clock generator 32 corresponding to 2× the pixel clock signal, it is possible to obtain up to 800 sampling points on signal sequence corresponding to one inch. Since the desired resolution, which has been mentioned to be 600 dpi in the example, it is a matter of selecting 600 sampling points of the 800 possible ones. Thus, the controller 25 determines the possibility of the necessary sampling points, and this is done by minimizing the distance between theoretical sampling points and the selected sampling points from the practically possible ones. Then the positions of the individual sampling points are modified to compensate for the mentioned spherical distortions and other kinds of optical unlinearities. A plurality is selected from a plurality of possible clock pulses or sampling points, and these are made a binary 1 in the clock sequence, while non-selected sampling points or clock pulses are made a binary 0. Then this digital signal is transferred to the RAM store 10 via the data and address bus 40, 39.

During scanning of the line the counter 8 successively addressed the stored data words in the RAM store 9, and these are transferred via the data bus 12 to the register 14 controlled by the decoder 11 which applies a load signal via the connection 18. The contents of the register 14 are read sequentially by the clock generator 32, said register 14 constituting the core of the invention, there being transferred a clock signal via the connection 20 that is synchronous with the clock signal from the clock generator 32, but lacks clock pulses so that the clock signal from the register 14 is not periodic. This clock signal serves as a control clock signal for the comparator 6 and a write clock signal for the RAM store 7. This means that the signal levels on the output of the comparator 6 vary from the individual pixels, but since the same write clock signal is used in the RAM 7, this variation is compensated.

This is illustrated in FIG. 6, which shows the analog signal from the scanner unit. The analog signal is provided by means of the pixel clock 3, which periodically generates a plurality of voltage levels corresponding to the sample values 50. The sample and hold circuit 2 and the filter 3 smooth the discrete voltage signal generated thereby to provide an envelope 51. If the signal was picked-up with a resolution of 400 dpi, and the clock from the register 14 was also to ensure a clock frequency of 400 dpi, a clock frequency of 2× the pixel clock from the clock frequency generator 32 would result in a binary signal 51 which changed between 0's and 1's.

If, on the other hand, a resolution of 600 dpi was desired, the sampling times would be as shown in FIG. 7, and the equidistantly located sampling times 50 would preferably be present. Every second interval between these sampling times 50 would be filled by a further sampling time 52, and the contents of the register S 14 would look like the sequence 54 under the graph in FIG. 7. This would mean that the distance between the sampling times is not constant and therefore differs from the actually desirable one, but this is smoothed, as mentioned, in the RAM store 7 by writing the sampled data. This means that the sampling times are shifted as indicated by errors in FIG. 7.

This would mean that the actual curve shape 51 changes somewhat, but this has no importance. It should be realized here that the curve shape 51 is drawn very incorrectly owing to the understanding of the importance of the sampling.

In addition, the controller 25 provides the RAM store 10 with information on the threshold values, if these change along the scanning line. The threshold values may be determined either as described in U.S. patent application Ser. No. 08/124,355 in which the document 22 is tiled and the threshold values of the individual tiles are determined, or as described in U.S. patent application Ser. No. 07/880,576 in which the threshold determination is performed as on-line tiled thresholding. Here the threshold values of zones are determined transversely to the original, and these zones constitute a band which is centered around the scanning line. For this to be feasible, a FIFO register will be interposed between the variable gain amplifier 5 and the comparator 6, which is described in detail in the former application and will therefore not be discussed in this context. U.S. patent application Ser. No. 07/890,576 and U.S. patent application Ser. No. 08/124,355 are hereby incorporated by reference.

The actual threshold values stored as data words in the RAM store 10 are selected by the counter 8 and transferred via the data bus 12 to the register 13 into which data are loaded controlled by the decoder 11 via the connection 19. The threshold value is transferred from the register 13 via a multibit data bus to the digital-to-analog converter 21, which forms an analog signal voltage that is incorporated as a threshold value in the comparator 6.

FIG. 8 shows how the register 14 operates, data being transferred to the register by an 8-bit data bus. The contents of the register 14 are clocked sequentially by a clock signal which e.g., corresponds to twice the pixel clock signal.

FIG. 9 shows how the counter 8 addresses the cells of the RAM store 10. Data words are transferred to the register 15 for every four pixels concerning the light correction. Correspondingly, data words are transferred to the register 14 for every four pixels concerning the variable sampling, while the threshold values are determined for larger groups of pixels, and it is therefore just necessary to transfer threshold value data at great intervals and at variations of the threshold value in the transition between the zones. It is possible to write in the RAM store during the rest of the time, including e.g., entering new threshold value data for later use.

Figure 2:
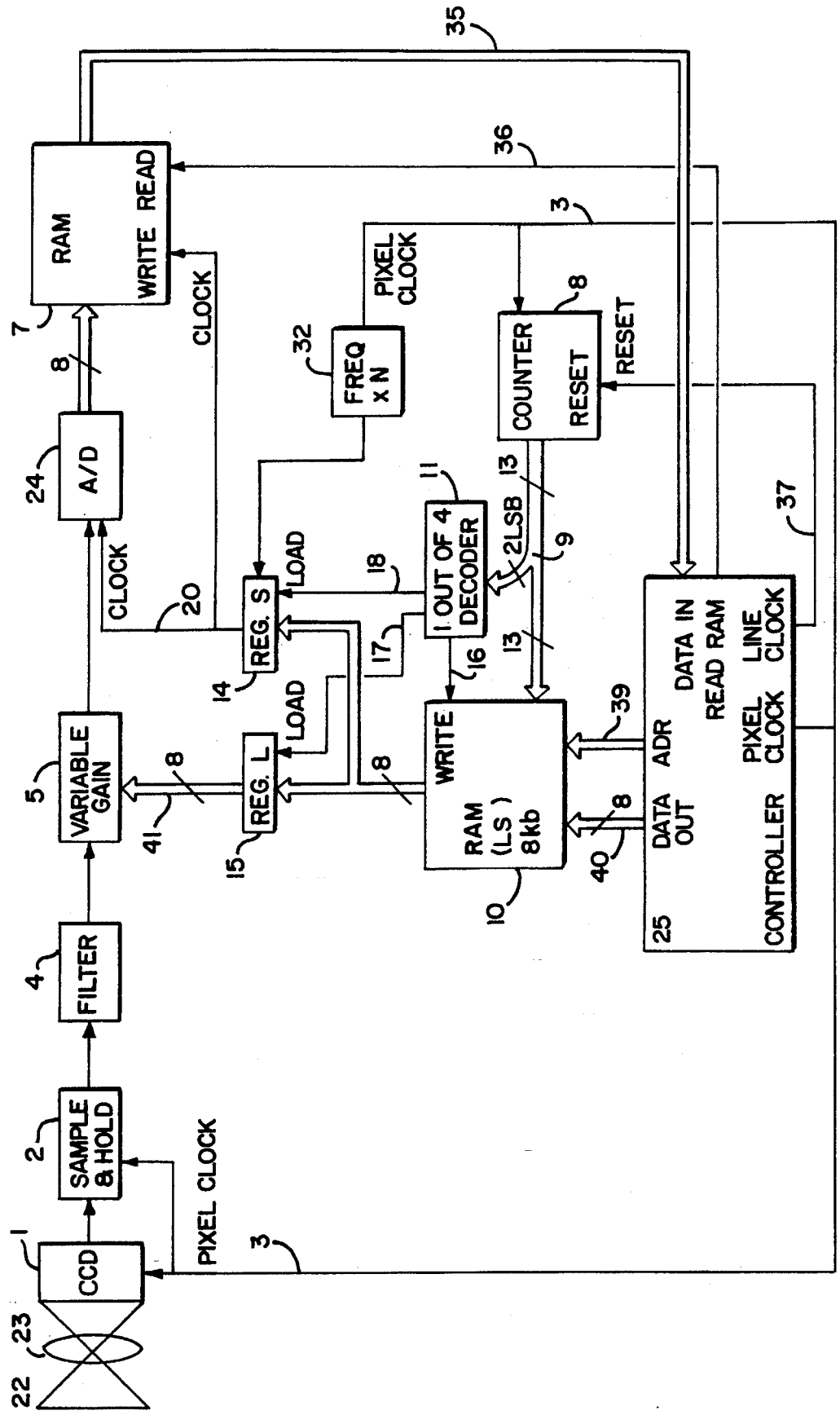
FIG. 2 shows another embodiment of a unit according to the invention for varying the resolution of an optical scanner.

FIG. 2 shows another embodiment of the part of an optical scanner shown in FIG. 1 and the difference between FIGS. 1 and 2 is that the comparator 6 in FIG. 6 has been replaced by an analog-to-digital converter 24. This means that the analog signal on the output of the variable gain amplifier 5 is regularly resampled controlled by the clock signal from the register 14, and data are thus transferred from the analog-to-digital converter 24 to the RAM store 7 in the form of multibit data for the resampled grey level values. Thus, no threshold value for the analog signal is entered, and the register 13 (FIG. 1) is therefore superfluous. The rest of the circuit operates as described above.

Figure 3:
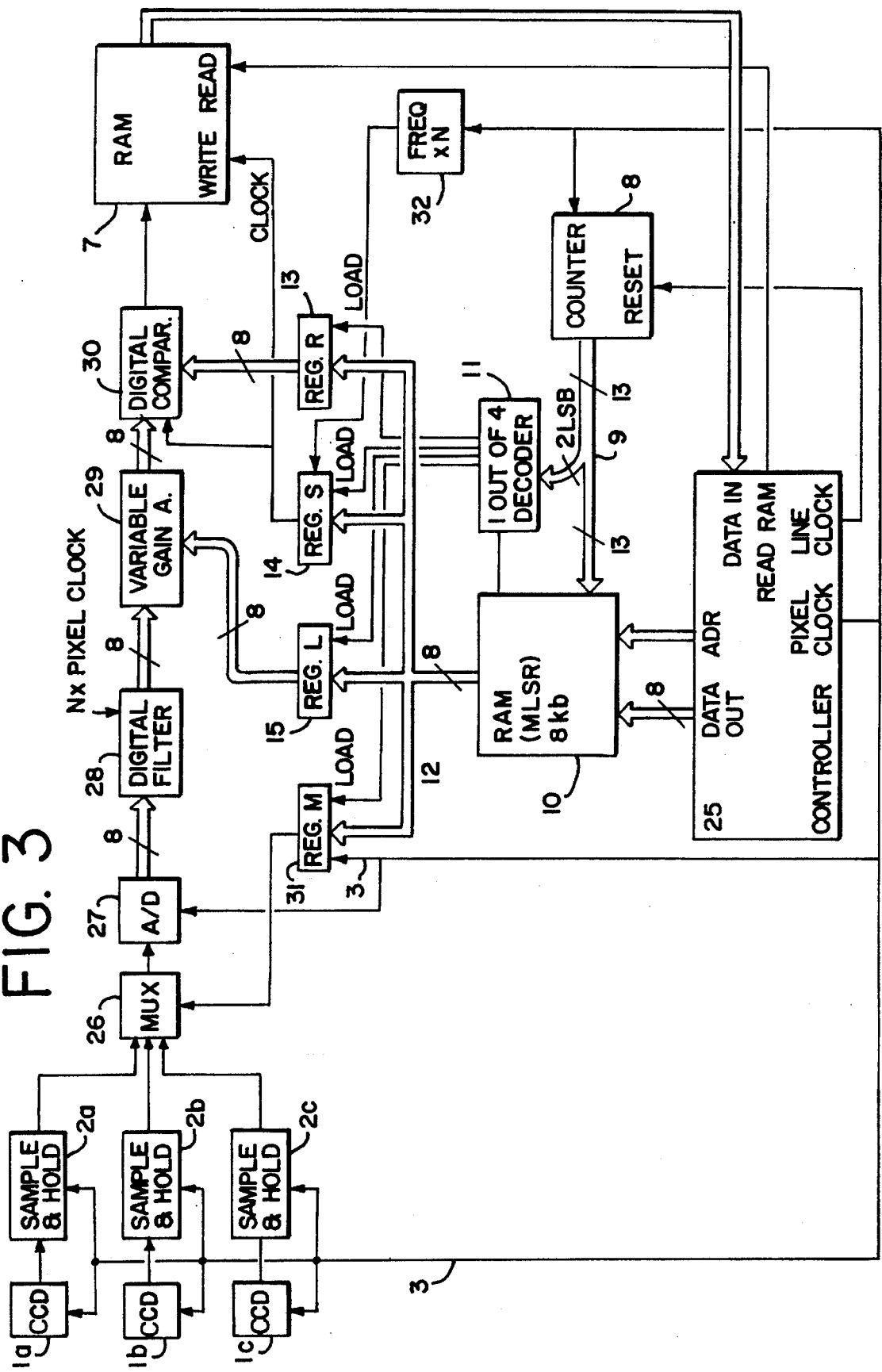
FIG. 3 shows a further alternative embodiment of a unit according to the invention for regulating the resolution of an optical scanner.

FIG. 3 shows a further alternative embodiment, and it is noted that the document is picked-up by three CCD cameras or arrays 1a–1c arranged in extension of each other. The contests of the CCD cameras 1a–1c are scanned by the sample and hold circuits 2a–2c. The discrete signals from the sample and hold circuits 2a–2c are transferred to a multiplexer 26, in which data are collected to provide a correct scanning line. The signals from the CCD cameras 1a–1c are stitched together as described in U.S. Pat. No.

5,117,295, and this done under controlled in the multiplexer 26.

The multiplexer 26 is moreover connected to the scanning units, so that data from the CCD camera 1a and the sample and hold circuit 2a are first clocked, following which data from the CCD camera 1b and the sample and hold circuit 2b are clocked. Finally, data from the CCD camera 1c and the sample and hold circuit 2c are clocked. These data are combined as shown in the previously mentioned U.S. Pat. No. 5,117,295.

The RAM store 10 contains information on how the individual bits are to be processed in the multiplexer 26, and this information is transferred to a register 31 which controls the multiplexer 26. The contents of the register 31 are clocked by the pixel clock signal 3. Data from the scanning line on the output on the multiplexer 26 are conveyed to an analog-to-digital converter 27 which converts the analog signal to a multibit signal. This multibit signal is passed via an 8-bit data bus to a digital filter 28 which digitally filters the digital signal.

An example of such a digital filter may be an FIR filter or the filter shown in FIG. 10. Here the multibit signal from the analog-to-digital converter 27 is passed to the filter, which here comprises an adder 50, a clock generator 51 and a shift register 52. The multibit signal on the input of the filter is branched, and one branch is passed directly to the adder 52, and the other branch is passed to the register 52, where the multibit signal is delayed one pixel clock period, and where the signal is divided by two, which is done by shifting the contents of the register one location to the right so that the register contains the 7 most significant bits (MSB) of the signal.

The clock generator 51 operates e.g., at a 2× pixel clock frequency and controls the adder 50 so that the multibit signal is coupled directly through the adder at every second clock pulse, and a new sample value is formed at every second clock pulse forming the average value of the two coupled sample values. For this purpose the adder 50 also divides the directly received sample value so that it is the 7 MSB bits of the two sample values shifted to the right that are added. It is important that the amount of sampling points supplied on the output of the filter which provides a resolution which is greater than or equal to the desired one.

The signal is passed further on from the digital filter 28 to a variable gain amplifier 29, which is digital in this case. This means that the digital input signal is multiplied by digital gain factor, and a corrected, digital signal is applied to the output, and this signal is passed to a comparator 30. Here the digital signal is compared with a digital threshold value representation received from the register 13. The digital comparator 30 applies binary signal to the output, and this is done under the control of the variable clock signal from the register 14. The other parts of the circuit operates as described in connection with FIG. 1.

It should be noted that the circuit shown in FIG. 3 may be used for storing multibit grey level values in the RAM store 7, if the digital comparator 30 is omitted. The variable resolution will be obtained in that the clock signal from the register 14 controls writing in the RAM store 7.

The principle of the invention can also be used on a color scanner, since the three color subsignals are processed individually. It will be desirable here to provide multibit hue values, so that the circuit may e.g., be of the type shown in FIG. 2. It is noted here that the variable clock will be the same for the three color channels, while the light sensitivity variation will be individual.

It is noted that light correction data and sample data in the RAM store 10 are normally retained during the scanning of a document, whereas the threshold data are currently updated during scanning of the document.

The RAM store 10 has been mentioned as being an assembled unit, but may be replaced buy individual stores for each individual one of the registers 13-15 and 31.

The filter 28 may be a higher order digital filter. The filter then interpolates digital grey level values for a pixel on the basis of grey level values for at least one of the adjacent pixels by use of a higher order interpolation function.

I claim:

1. An optical scanner having a variable resolution comprising:

an optical detecting unit which, controlled by a controller generated pixel clock signal, applies a discrete signal representing pixels in a scanned region;

a filter for filtration of the discrete signal;

a sample clock generator comprising a counter, a store, and a first register;

a clock-controlled analog-to-digital converter connected to receive the discrete signal from the filter, said converter converts the discrete signal to a digital signal having a preselected resolution, said resolution being controlled by the sample clock generator;

said counter receiving the pixel clock signal and generating a multibit signal;

said store containing binary data words, said multibit signal from the counter serving as an address signal for the store, an addressed, binary data word generated and read by the store;

said first register receiving the read, binary data word from the store and being coupled to a second periodic clock generator which controls reading from the register so as to provide a clock signal having clock pulses when individual bits of the data word assume a first binary state, and having no clock pulses when the individual bits of the data word assume a second binary state, said clock signal being passed to the analog-to-digital converter as a sample clock signal.

2. An optical scanner according to claim 1, wherein the optical detecting unit comprises a CCD array connected to a sample and hold circuit, and said sample and hold circuit holding signals at levels for a period corresponding to a pixel clock period.

3. An optical scanner according to claim 1, wherein the optical detecting unit further comprises at least two CCD arrays having signals; at least two sample and hold circuits, each connected to one of the CCD arrays, each sample and hold circuit holding signal levels for a period corresponding to a pixel clock period; and said optical scanner further comprising a multiplexer for multiplexing the signals from the sample and hold circuits, said multiplexer generating an output signal corresponding to a line located transversely to the scanned region.

4. An optical scanner according to claim 3, wherein the store comprises a RAM containing information on how the signals from the individual CCD arrays are to be multiplexed and including:

multiplexed data words generated by the multiplexer; the multiplexed data words having addresses selected by the counter; and said optical scanner further comprising a fourth register to receive the multiplexed data words from the RAM; a decoder connected to the counter to control reading and transferring the multiplexed data words to the forth register; and a correct scanning line determined by the multiplexed data words in the fourth register, said multiplexed data words joining signals from the individual CCD arrays.

5. An optical scanner according to claim 1, wherein the filter comprises an analog lowpass filter which smooths the discrete signal.

6. An optical scanner according to claim 1, wherein the analog-to-digital converter converts the discrete signal to a digital signal; the filter comprises a digital filter which uses weighed averaging, and the digital filter averages digital grey level values for a pixel with digital grey level values for adjacent pixels.

7. An optical scanner according to claim 1, further comprising:

a variable gain amplifier connected to the filter;

said detecting unit having light sensitive cells; and the variable gain amplifier regulating an amplitude of a signal sequence from the filter in response to the light sensitive cells.

8. An optical scanner according to claim 7, wherein the store comprises a RAM having stored therein data words with information on variations of the light-sensitive cells of the detecting unit located transversely to the scanning line, the data words having addresses selected by the counter; and said optical scanner further comprising a third register to receive the data words from the RAM; a decoder connected to the counter to control reading and transferring the data words to the third register; and said variable gain amplifier generating signal sequences of the discrete signal which are regulated by the data words.

9. An optical scanner according to claim 1, wherein the analog-to-digital converter comprises a threshold value comparator which compares a threshold value to a signal received from the filter at a sampling time and generates a 1-bit value binary signal.

10. An optical scanner according to claim 9, wherein the threshold value comparator comprises a digital comparator which compares a digital signal with a digital threshold value.

11. An optical scanner according to claim 9, wherein the store comprises a RAM having stored therein data words having information on local threshold values located transversely to the scanning line; said data words having addresses selected by the counter; and said optical scanner further comprising a second register to receive the data words from the RAM; a decoder connected to the counter to control reading and transferring the data words, and the threshold value comparator using data words from the second register to generate an actual, local threshold value.

12. An optical scanner according to claim 11, further comprising a digital-to-analog converter to transfer the data words of the second register to the comparator, and said digital-to-analog converter generating an analog threshold value representation of the data words.

13. An optical scanner according to claim 11, wherein, the data words of the second register are transferred to the comparator as a multibit threshold value representation.

14. An optical scanner according to claim 1, wherein the analog-to-digital converter samples the discrete signal and generates a multibit, digital signal controlled by the sample clock generator.

15. An optical scanner according to claim 1, wherein the counter comprises an incremental counter which counts clock pulses, and the incremental counter generates a multibit signal having information on a position of an actual pixel in a scanning line.

16. An optical scanner according to claim 1, wherein the store comprises a RAM having stored therein data words selected by the counter; and said optical scanner further comprising a decoder connected to the counter to control reading and transferring the data words to the first register.

17. An optical scanner according to claim 1, wherein the second clock generator comprises a multiplication means which multiplies the pixel clock signal by N, where N is an integer greater than or equal to 1.

18. An optical scanner according to claim 17, wherein the multiplication means multiplies the pixel clock signal by two.

19. An optical scanner having a variable resolution comprising:

an optical detecting unit which, controlled by a controller generated pixel clock signal, applies a discrete signal representing pixels scanned in a region;

an analog filter for lowpass filtration of the discrete signal;

a clock-controlled analog-to-digital converter which converts the discrete signal to a digital signal having a preselected resolution, said resolution being controlled by a sample clock generator;

said sample clock generator comprising a counter, a store, as well as a first register;

said counter receiving the pixel clock signal and generating a multibit signal;

said store containing binary data words, said multibit signal from the counter serving as an address signal, an addressed, binary data word generated and read by the store; and said first register receiving the read binary data word from the store and being coupled to a second periodic clock generator which controls reading from the register so as to provide a clock signal having clock pulses when individual bits of the data word assume a first binary state, and having no clock pulses when the individual bits of the data word assume a second binary state, said clock signal being passed to the analog-to-digital converter as a sample clock signal.

20. An optical scanner according to claim 19, wherein the optical detecting unit comprises a CCD array connected to a sample and hold circuit, and said sample and hold circuit holding signal levels for a period corresponding to a pixel clock period.

21. An optical scanner according to claim 19, wherein the analog lowpass filter smooths the discrete signal.

22. An optical scanner according to claim 19 further comprising:

a variable gain amplifier coupled to the filter;

said detecting unit having light sensitive cells; and the variable gain amplifier regulating an amplitude of a signal sequence from the filter in response to the light sensitive cells.

23. An optical scanner according to claim 22, wherein the store comprises a RAM having stored therein data words with information on variations of the light-sensitive cells of the scanning unit located transversely to the scanning line, the data words having addresses selected by the counter; and said optical scanner further comprising a third register to receive the data words from the RAM; a decoder connected to the counter to control reading and transferring the data words to the third register; and said variable gain amplifier generating signal sequences of the discrete signal which are regulated by the data words.

24. An optical scanner according to claim 19 wherein the analog-to-digital converter comprises a threshold value comparator which compares a threshold value to a signal received from the filter at sampling time and generates a 1-bit value binary signal.

25. An optical scanner according to claim 24, wherein the store comprises a RAM having stored therein data words having information on local threshold values located transversely to the scanning line; said data words having addresses selected by the counter; and said optical scanner further comprising a second register to receive the data words from the RAM; a decoder connected to the counter to control reading and transferring the data words; and the threshold value comparator using the data words from the second register to generate an actual, local threshold value.

26. An optical scanner according to claim 25, further comprising a digital-to-analog converter to transfer the data words of the second register to the comparator, and said digital-to-analog converter generating an analog threshold value representation of the data words.

27. An optical scanner according to claim 19 wherein the analog-to-digital converter samples the discrete signal and generates a multibit, digital signal controlled by the sample clock generator.

28. An optical scanner according to claim 19, wherein the counter comprises an incremental counter which counts clock pulses, and the incremental counter generates a multibit signal having information on a position of an actual pixel in a scanning line.

29. An optical scanner according to claim 19, wherein the store comprises a RAM having stored therein data words selected by the counter; and said optical scanner further comprising a decoder connected to the counter to control reading and transferring the data words to the first register.

30. An optical scanner according to claim 19, wherein the further clock generator comprises a multiplication means which multiplies the pixel clock signal by N, where N is an integer greater than or equal to 1.

31. An optical scanner according to claim 30, wherein the multiplication means multiplies the pixel clock signal by two.

32. An optical scanner having a variable resolution comprising:

an optical detecting unit which, controlled by a controller generated pixel clock signal, applies a discrete signal representing pixels scanned in a region;

an analog-to-digital converter for converting the discrete signal to a digital multibit signal;

an digital filter for filtration of the multibit signal;

a sample clock generator comprising a counter, a store, and a first register;

a digital comparator for comparing the filtered signal with a digital threshold value representation received from the first register and said digital comparator generating a digital signal;

said counter receiving the pixel clock signal and generating a multibit signal;

said store containing binary data words, said multibit signal from the counter serving as an address signal, an addressed binary data word being read from by store;

said first register receiving the read binary data word from the store and being coupled to a second periodic clock generator which controls reading from the register so as to provide a clock signal having clock pulses when the individual bits of the data word assume a first binary state, and having no clock pulses when the bits of the data word assume a second binary state, said clock signal being passed to the analog-to-digital converter as a sample clock signal.

33. An optical scanner according to claim 32, wherein the optical detecting unit comprises a CCD array connected to a sample and hold circuit, and said sample and hold circuit holding signals at levels for a period corresponding to a pixel clock period.

34. An optical scanner according to claim 32, wherein the optical detecting unit further comprises at least two CCD arrays having signals; at least two sample and hold circuits, each connected to one of the CCD arrays, each sample and hold circuit holding respective signal levels for a period corresponding to a pixel clock period; and said optical scanner further comprising a multiplexer for multiplexing the signals from the sample and hold circuits, said multiplexer generating an output signal corresponding to a line located transversely to the scanned region.

35. An optical scanner according to claim 34, wherein the store comprises a RAM containing information on how the signals from the individual CCD arrays are to be multiplexed and including:

multiplexed data words generated by the multiplexer, the multiplexed data words having addresses selected by the counter; and said optical scanner further comprising a fourth register to receive the multiplexed data words from the RAM; a decoder connected to the counter to control reading and transferring the multiplexed data words to the fourth register; and a correct scanning line determined by the multiplexed data words in the fourth register, said multiplexed data words used for joining signals from the individual CCD arrays.

36. An optical scanner according to claim 32, wherein the analog-to-digital converter converts the discrete signal to a digital signal; the filter comprises a digital filter which uses weighed averaging, and the digital filter averages digital grey level values for a pixel with digital grey level values for adjacent pixels.

37. An optical scanner according to claim 36, wherein said filter comprises a high order digital filter which interpolates digital grey level values for the pixel on the basis of grey level values for at least one adjacent pixel by use of a higher order interpolation function.

38. An optical scanner according to claim 32 further comprising:

a variable gain amplifier coupled to the filter;

said detecting unit having light sensitive cells; and the variable gain amplifier regulating an amplitude of a signal sequence from the filter in response to the light sensitive cells.

39. An optical scanner according to claim 38, wherein the store comprises a RAM having stored therein data words with information on variations of the light-sensitive cells of the detecting unit located transversely to the scanning line, the data words having addresses selected by the counter; and said optical scanner further comprising a third register to receive the data words from the RAM; a decoder connected to the counter to control reading and transferring the data words the third register; and said variable gain amplifier generating signal sequences of the discrete signal which are regulated by the data words.

40. An optical scanner according to claim 32, wherein the analog-to-digital converter comprises a threshold value comparator which compares a threshold value to a signal received from the filter at a sampling time and generates a 1-bit value binary value.

41. An optical scanner according to claim 40, wherein the threshold value comparator comprises a digital comparator which compares a digital signal with a digital threshold value.

42. An optical scanner according to claim 40, wherein the store comprises a RAM having stored therein data words having information on local threshold values located transversely to a scanning line; said data words having addresses selected by the counter; and said optical scanner further comprising a second register to receive the data words from the RAM; a decoder connected to the counter to control reading and transferring the data words, and the threshold value comparator using data words from the second register to generate an actual, local threshold value.

43. An optical scanner according to claim 42, wherein the data words of the second register are transferred to the comparator as a multibit threshold value representation.

44. An optical scanner according to claim 32, wherein the counter comprises an incremental counter which counts clock pulses, and the incremental counter generates a multibit signal having information on a position of an actual pixel in a scanning line.

45. An optical scanner according to claim 32, wherein the store comprises a RAM having stored therein data words selected by the counter; and said optical scanner further comprising a decoder connected to the counter to control reading and transferring the data words to the first register.

46. An optical scanner according to claim 32, wherein the second clock generator comprises a multiplication means, which multiplies the pixel clock signal by N, where N is an integer greater than or equal to 1.

47. An optical scanner according to claim 46, wherein the multiplication means multiplies the pixel clock signal by two.

* * * * *